United States Patent
Franco et al.

(10) Patent No.: US 10,414,505 B2
(45) Date of Patent: Sep. 17, 2019

(54) AIRCRAFT AIR CONDITIONING SYSTEM AIRFLOW REGULATION

(71) Applicant: Embraer S.A., São José dos Campos-SP (BR)

(72) Inventors: Bernardo Campos da Silva Franco, São José dos Campos (BR); Leandro Coelho Herd, São José dos Campos (BR); André Mendes Quintino, São José dos Campos (BR); Nicolau Braga Santos, São José dos Campos (BR)

(73) Assignee: Embraer S.A., São José dos Campos (BR)

( * ) Notice: Subject to any disclaimer, the term of this patent is extended or adjusted under 35 U.S.C. 154(b) by 57 days.

(21) Appl. No.: 15/256,280

(22) Filed: Sep. 2, 2016

(65) Prior Publication Data
US 2018/0065752 A1 Mar. 8, 2018

(51) Int. Cl.
*B64D 13/06* (2006.01)
*B64D 13/02* (2006.01)

(52) U.S. Cl.
CPC .............. *B64D 13/06* (2013.01); *B64D 13/02* (2013.01); *B64D 2013/0618* (2013.01); *Y02T 50/56* (2013.01)

(58) Field of Classification Search
CPC ..................... B64D 13/06; B64D 13/02; B64D 2013/0618; B64D 2013/0603; B64D 2013/0611; B64D 2013/0614
See application file for complete search history.

(56) References Cited

U.S. PATENT DOCUMENTS

| 2,721,456 A | 10/1955 | Whitney, Jr. et al. |
| 3,192,848 A * | 7/1965 | Townsend .............. B64D 13/04 454/73 |

(Continued)

OTHER PUBLICATIONS

Embraer 135/145, Pneumatic Air Conditioning—Pressurization, Systems Summary, Oct. 12, 2007, 39 pages.

(Continued)

*Primary Examiner* — Larry L Furdge
(74) *Attorney, Agent, or Firm* — Nixon & Vanderhye P.C.

(57) ABSTRACT

An environmental control system for an aircraft uses engine bleed air for cabin environment control. The environment control system regulates the inlet airflow by assessing a plurality of parameters that provides, but not limited to, the aircraft operating conditions and external environment data, aiming at substantially reducing the extracted engine bleed air demand for cabin environment control and fuel consumption reduction and concurrently complying with aircraft pressurization, ventilation and thermal load requirements. The environmental control system airflow target is calculated based on the actual aircraft operating conditions, external environment data and a multi-dimensional airflow schedule map. Then, environmental control system airflow target is further trimmed based on the actual aircraft operating conditions and air conditioning system performance capabilities by fixing the air conditioning airflow outlet temperature and then regulating the air conditioning inlet mass airflow through the flow control valve. The first control method reduces and the second one trims the environmental control system airflow target comparing to conventional control methods. Thus, fuel consumption reduction is obtained when the environment control system airflow target (extracted bleed air demand) can be reduced and or trimmed depending on flight conditions.

26 Claims, 4 Drawing Sheets

(56) References Cited

U.S. PATENT DOCUMENTS

| | | | | |
|---|---|---|---|---|
| 4,263,786 A | * | 4/1981 | Eng | B64D 13/06 |
| | | | | 62/172 |
| 2008/0283663 A1 | * | 11/2008 | Space | B64D 13/06 |
| | | | | 244/118.5 |
| 2013/0248164 A1 | | 9/2013 | Kelnhofer et al. | |

OTHER PUBLICATIONS

FAA Federal Aviation Regulations (FARS, 14 CFR), Part 25, Section 831—Ventilation, Jan. 8, 2005, 2 pages.
SAE International, ARP85, Air Conditioning Systems for Subsonic Airplanes, 2016, 1 page.
A350 XWB News, "A350 XWB cabin air quality will make a comfortable flight although −50° C. outside," Nov. 16, 2012, 4 pages.

\* cited by examiner

Control algorithm

AIRCRAFT AIR CONDITIONING SYSTEM AIRFLOW REGULATION

CROSS-REFERENCE TO RELATED APPLICATIONS

None.

STATEMENT REGARDING FEDERALLY SPONSORED RESEARCH OR DEVELOPMENT

None.

FIELD

The technology relates to an aircraft air conditioning system (environmental control system). In more detail, the technology relates to adaptive control(s) for reducing the extracted engine bleed airflow to the aircraft cabin based on parameters such as the aircraft operational conditions, external environment and cooling/heating equipment performance capabilities.

BACKGROUND

Aircraft pneumatic and air conditioning systems, as described in SAE ARP85F, are typically used on subsonic commercial aircraft to maintain adequate environmental conditions within the aircraft cabin. The system usually comprises an arrangement of equipment, controls and indications that supply and distribute conditioned air to the aircraft cabin and compartments in a way that avoids overheating or overcooling due to the thermodynamic balance of the compartments. Such systems contemplate and consider occupants' body heat transfer, solar radiation, electrical equipment thermal dissipation, convection with the external ambient air temperature. In addition, the air conditioning system supplies an amount of fresh air into the aircraft cabin to ensure air quality by maintaining the levels of gases such as oxygen, carbon dioxide, carbon monoxide and it also supports the pressurization of the aircraft cabin.

In some non-limiting applications, it may be desirable to optimize, reduce or minimize the consumption of bleed airflow diverted from gas turbine engines (reducing fuel consumption).

BRIEF DESCRIPTION OF THE DRAWINGS

The following detailed description of exemplary non-limiting illustrative embodiments is to be read with the drawings of which.

DETAILED DESCRIPTION OF EXAMPLE NON-LIMITING EMBODIMENTS

Figure 1:
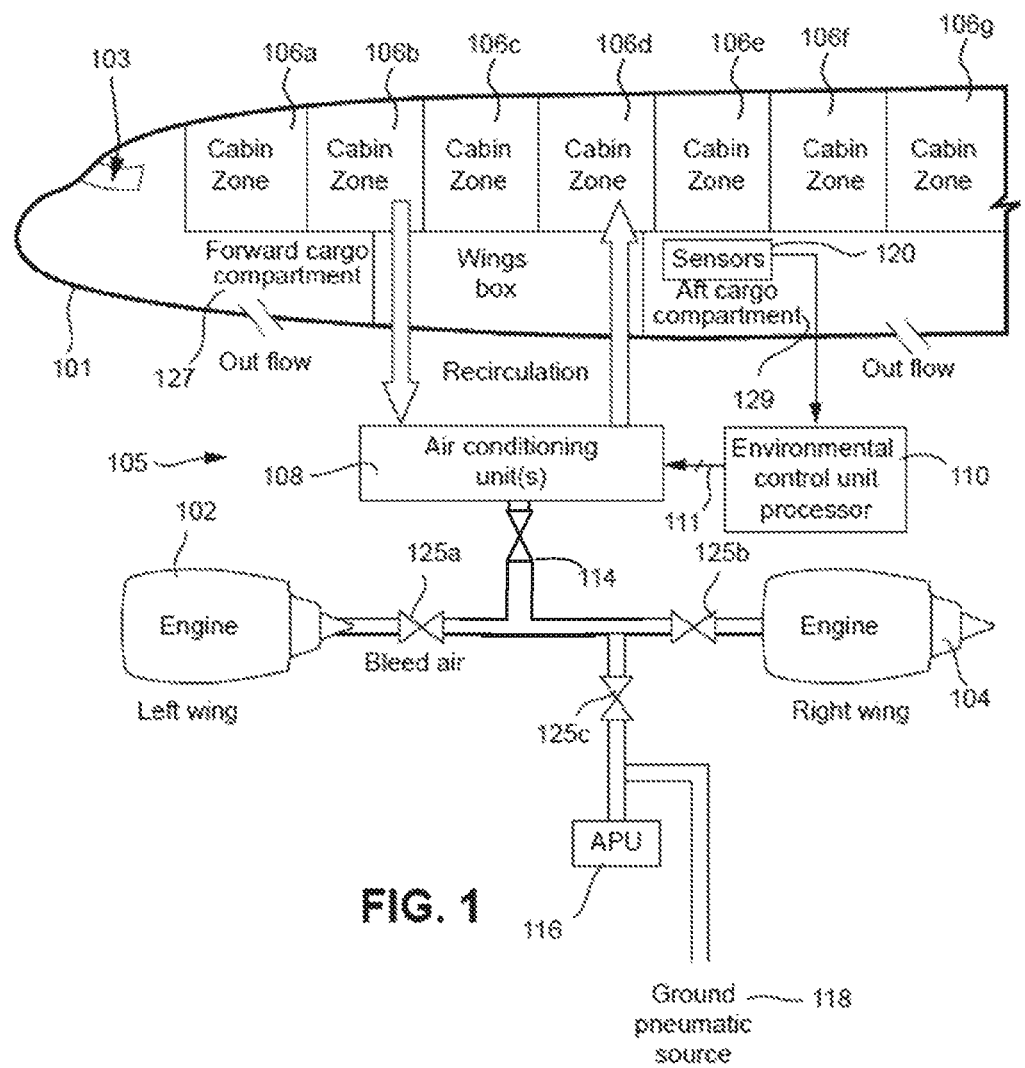
FIG. 1 is a block diagram of an example non-limiting aircraft including an environmental control system.

In aircraft such as shown in FIG. 1, the environmental control system receives high pressure, high temperature air from the main engines compressor (bleed air). The controlled. ECS airflow schedule is sized to comply concurrently with ventilation (FAR/JAR 25.831), pressurization and thermal loads requirements, for the entire aircraft operational envelope. Typically, the air conditioning airflow schedule is fixed and proportional to the aircraft flight altitude, and the environmental control system controls the supply air temperature through the air conditioning unit in order to properly maintain the cabin environmental conditions.

If the air conditioning flow schedule were proportional only to the flight altitude, the schedule would be sized to comply with the extremes of the aircraft environmental and operational envelop, consequently leading to higher and unnecessary engine bleed airflow consumption. Consuming too much bleed air can have disadvantages including decreased engine efficiency and increased fuel consumption.

The example non-limiting technology achieves demand for reduced ECS airflow through inputs that affect the fresh airflow and the thermal load requirements, having a 4D flow schedule map (number of occupants, TAT or total air temperature, flight altitude and ECS airflow target).

After that, this obtained flow is trimmed by a second control loop which modifies the structure of a typically controlled ECS, but obtains the same thermodynamic performance (i.e., instead of setting the flow and controlling the cooling/heating equipment outlet temperature, the non-limiting embodiments set the cooling/heating equipment outlet temperature and control the flow).

An environmental control system for an aircraft regulates the extracted engine bleed airflow by assessing a plurality of parameters that indicate the actual aircraft operating conditions, external environment and cooling/heating equipment performance capabilities, aiming at substantially reducing the demand of extracted engine bleed airflow and concurrently complying with the pressurization, ventilation and thermal load requirements.

An adaptive control logic on or in the system controller assesses the actual aircraft operating conditions, external environment and cooling/heating equipment performance capabilities and regulates the ECS airflow demand based on those inputs/parameters. A two-step control loop for the aircraft environmental control system provides ECS airflow regulation. A first control loop optimizes the ECS airflow demand by considering the actual aircraft operating conditions and external environment. The second loop trims and optimizes the ECS airflow demand by regulating the ECS airflow and fixing the air conditioning unit outlet temperature by considering the cooling/heating equipment performance capabilities.

The aircraft operating conditions are assessed by obtaining the number of occupants on the present flight from the aircraft avionics system and measuring the current cabin and cockpit environmental temperatures through temperature sensors installed on the compartments. The external environmental conditions are evaluated based on the current aircraft flight altitude and the total air temperature measured by the external sensors. Ultimately, the system capabilities are evaluated by the system controller considering the cooling/heating equipment performance.

Figure 2:
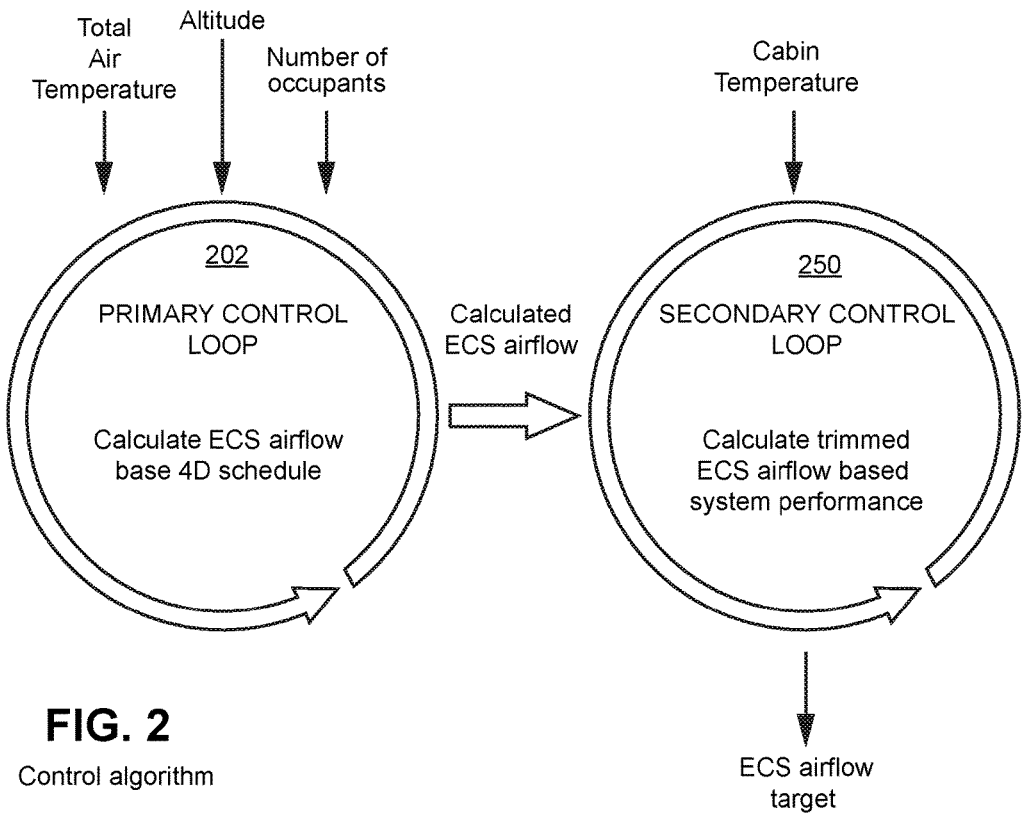
FIG. 2 shows an example non-limiting two-loop adaptive control strategy to develop an ECS airflow target control signal for instructing a flow control valve(s).

As shown in FIG. 2, the first or primary control loop 202 evaluates the target of air conditioning air mass flow by assessing three values: (a) the number of occupants (which is obtained from the aircraft avionics, typically based on input by pilot or flight crew); (b) Total Air Temperature (TAT) (measured by a sensor external to and mounted on the fuselage, and indicative of the external ambient air stagnation temperature outside the aircraft); and (c) Flight Altitude. The result of this adaptive control is a four-dimensional (4D) air mass flow schedule map. The controller uses outside air temperature, aircraft altitude and number of occupants to determine the ECS airflow target for inflow into the aircraft cabin and associated bleed flow demand. The Primary control loop 202 calculates the airflow based on actual flight altitude and compensates for actual external air stagnation temperature and number of occupants. The primary control loop 202 uses a four-dimensional lookup table which provides a mass air flow schedule based on the three inputs/parameters. The primary control loop 202 calculates an ECS airflow based 4D schedule map that will control how much ECS airflow must be supplied to the cabin.

The ECS airflow complies concurrently with the ventilation, thermal load and pressurization airflow requirements imposed by FAA regulations. The Primary control loop 202 can perform its operation independently of the second control loop 250. The Primary control loop 202 can be used and/or applied on the aircraft without the secondary control loop 250. The ECS airflow is validated based on the system configuration and compared with the ventilation, thermal load and pressurization requirements and is adjusted accordingly to meet concurrently those requirements. In this way, the ECS airflow the Primary control loop 202 provides is prevented from causing the system to operate outside of regulated limits. If any problem that affects the Primary control loop 202 is observed, the system goes back automatically to the default (typical) ECS airflow calculation based on flight altitude only.

The output of the first control loop 202 is then evaluated if further optimization is still possible to be performed 252. In the example non-limiting embodiment, a second or secondary adaptive control loop 250 assesses the current performance being used on the air conditioning unit. The control of the air conditioning is then changed. Instead of regulating the outlet temperature of the machine, the secondary control loop 250 fixes the temperature to lower or higher values and then regulates the airflow through the flow control valve to still meet the thermodynamic performance required to properly maintain the aircraft cabin environment. In more detail, given the already-calculated ECS airflow target determined to comply with applicable regulations, the secondary loop 250 uses the cabin temperature sensor to trim the already-calculated ECS airflow target based on current temperature readings. The trimming is used to change the ECS airflow target in response to the measured temperature. The secondary control loop 250 performs additional adaptive evaluation (calculations) 252 to determine whether ECS airflow otherwise required can be trimmed or optimized. If so, the secondary control loop 250 calculates a trimmed ECS airflow for use as a control signal to the flow control valves. If not, then the output of the primary control loop 202 is passed on directly to control the ECS airflow, and the secondary control loop 252 is bypassed.

The trimmed ECS airflow is validated based on the system configuration and compared with the ventilation, thermal load and pressurization requirements and is adjusted accordingly to meet concurrently those requirements. In this way, the optimization the secondary control loop 250 provides is prevented from causing the system to operate outside of regulated limits. The output of the combination of adaptive control loops 202, 250 is the optimized extracted bleed air mass flow for given operation which still complies with the ventilation, pressurization and aircraft thermal load requirements and objectives.

The secondary control loop 250 can perform its trimming operation independently of the first control loop 202. This for example enables the secondary control loop 250 to be added to an existing system without requiring the first control loop 202. If any problem that affects the secondary control loop 250 is observed, the system goes back automatically to the default (typical) ECS airflow calculation based on flight altitude only. In other implementations, the primary and secondary control loops 202, 250 can be combined into a single overall control loop that considers all inputs. If any problem that affects the primary and/or secondary control loop 202, 250 is observed, the system goes back automatically to the default (typical) ECS airflow calculation based on flight altitude only.

The secondary control loop 250 operates continually and recursively to recalculate the trimmed optimized ECS airflow target based on the cabin temperature input it receives and any updated mass air flow the first control loop 202 provides. The secondary control loop 250 can be repeated relatively rapidly (e.g., once or many times a second, with any required hysteresis provided to avoid unduly repetitive operation of flow control valves and associated wear). For example, if the trimmed ECS airflow target results in incorrect (too high or too low) cabin temperature, the secondary control loop 250 adapts and corrects the trimmed ECS airflow target in response to sensor input. Similarly, if the first control loop 202 changes the instructed ECS airflow, the secondary control loop 250 will adapt by calculating a new corresponding trimmed ECS airflow.

More Detailed Explanation

FIG. 1 illustrates working mechanisms of an aircraft including an environmental control unit 105 and how such aircraft can maintain pressurization, ventilation and thermal load requirements during both ground operations and flight operations. The temperature and pressure of air within the aircraft fuselage 101 are controlled by environmental control system components within and outside of the aircraft in FIG. 1. These components maintain proper fresh airflow, pressurization and temperature within the aircraft to support human life and comfort even when the aircraft is flying at high altitudes of low external ambient air pressure and temperature.

The air outside an aircraft flying at 30,000 feet might be −48 degrees Fahrenheit and only on the order of 4 pounds per square inch. Despite this hostile environment, the aircraft's air handling system components maintain pressurization of about 8 pounds per square inch and 68 degrees Fahrenheit (regulated by the flight crew) with a proper mix of oxygen to other gases including water vapor within the pressurized cabin.

The fuselage 101 defines a flight deck 103 and cabin zones (106a-106g). The cabin zones 106 are occupied by passengers and flight deck 103 is occupied by crew. The number of human occupants on board the aircraft affects demand of the air handling system because: (a) humans inhale $O_2$ and exhale $CO_2$ and water vapor during normal respiration, (b) human bodies radiate heat that warms the atmosphere within the fuselage 101 and (c) minimum fresh airflow requirement. The number of occupants is a factor used to determine air handling system demand and ventilation requirements.

The normal operation of a gas turbine jet engine 102, 104 produces air that is both compressed (high pressure) and heated (high temperature). In more detail, a gas turbine engine 102, 104 uses an initial stage air compressor to feed the engine with compressed air. Aircraft designers learned long time ago that it is possible to bleed some of this compressed heated air from certain compressor stages of the operating gas turbine engines 102, 104 and use it for other purposes (e.g., cabin pressurization and temperature maintenance) without adversely affecting engine operation and efficiency. While the aircraft is flying, the engines 102, 104 themselves provide a convenient source of pressurized hot air to maintain cabin temperature and pressure.

An environmental control system such as shown in FIG. 1 can automatically control the amount of ECS air mixed with recirculation air to maintain proper cabin temperature, pressure and humidity. It is often desirable to minimize or optimize the ECS air usage to reduce the flow of bleed air being bled from the engines 102, 104.

During ground operation of the aircraft, bleed air sources include, but are not limited to, the APU 116, and the ground pneumatic sources 118. During flight operation of the aircraft, bleed air sources include, but are not limited to, left engine(s) 102, right engine(s) 104, and APU 116.

Bleed air provided by the APU 116, the ground pneumatic source 118, the left engine(s) 102, the right engine(s) 104 is supplied via bleed airflow manifold and associated pressure regulators and temperature limiters to the air conditioning units 108 of the aircraft. Air conditioning units 108 may also mix recirculated air from the cabin zones 106a-106g and flight deck 103 with bleed air from the previously mentioned sources. An environmental control unit controller 110 controls flow control valve(s) 114 to regulate the amount of bleed air supplied to the air conditioning units 108. Bleed valve(s) 125 are used to select the bleed sources.

Air conditioning and distribution units receive and provide a desired mixture of fresh bleed air and recirculated air. In this context, the term "air conditioning" is not limited to cooling but refers to preparing air for introduction into the interior of the aircraft fuselage 101. The air conditioning unit(s) 108 and flow control valve (s) 114 regulate the air mass flow and temperature inside of the cabin zones 106a-106g and the flight deck 103 and also maintain proper atmosphere for the cargo 127, 129.

There can be redundant environmental control unit 105 (e.g., one for the cockpit and another for the passenger cabin). In one example embodiment, each ECU 105 comprises an air conditioning unit 108 including a dual heat exchanger, an air cycle machine (compressor, turbine, and fan), a condenser, a water separator and related control and protective devices. The automatically-controlled bleed air from the pneumatic system supplies the ECU 105. Inside the ECU 105, the ECS airflow is divided into two lines: a cold line passes through to the Air Cycle Machine, and a hot line bypasses the Air Cycle Machine. In the Air Cycle Machine (ACM), air is cooled in the primary heat exchanger and passes through the compressor causing a pressure increase. The cooled air then goes to the secondary heat exchanger where it is cooled again. After leaving the secondary heat exchanger, the high-pressure cooled air passes through a condenser and a water separator for condensed water removal. The main bleed airstream is ducted to the turbine and expanded to provide cold airflow and power for the compressor and cooling fan. The cold airflow is mixed with warm air supplied by the recirculation fan and/or with the hot bypass bleed air immediately upon leaving the turbine.

The environmental control unit (ECU) controller 110 can maintain pressurization, ventilation and thermal load requirements by providing proper instructions/commands in control signals. The environmental control unit controller 110 receives input from the sensors 120 in the cabin zones 106a-106g, the flight deck 103. The pilot or crew also inputs parameters such as number of occupants and desired cabin temperature. Based on these and other parameters, the environmental control unit controller 110 calculates a proper ECS airflow target to control flow control valves 125. The ECU controller 110 provides the air conditioning unit 108 with instructions/commands/control signals 111 to control the flow control valves 125 and other aspects of the system operation. The system typically includes necessary circuitry and additional processing to provide necessary drive signals to the flow control valves 125.

The environmental control unit controller 110 has the competence to register the ECS airflow required for the aircraft, while continually adjusting the flow. The air conditioning units 108 of the aircraft receive control signals from the environmental control unit controller 110 and can provide adequate mass airflow to the cabin zones 106a-106g, the flight deck 103, the forward cargo compartment 127, and the aft cargo compartment 129, while simultaneously recirculating air within the aircraft.

The environmental control system (ECS) comprises, but not limited to, an arrangement of ECU(s) (air conditioning unit, controller and flow control valve), sensors, airflow distribution ducts, recirculation fans, EPA filters, a plurality of signals and indications, etc.

Figure 3:
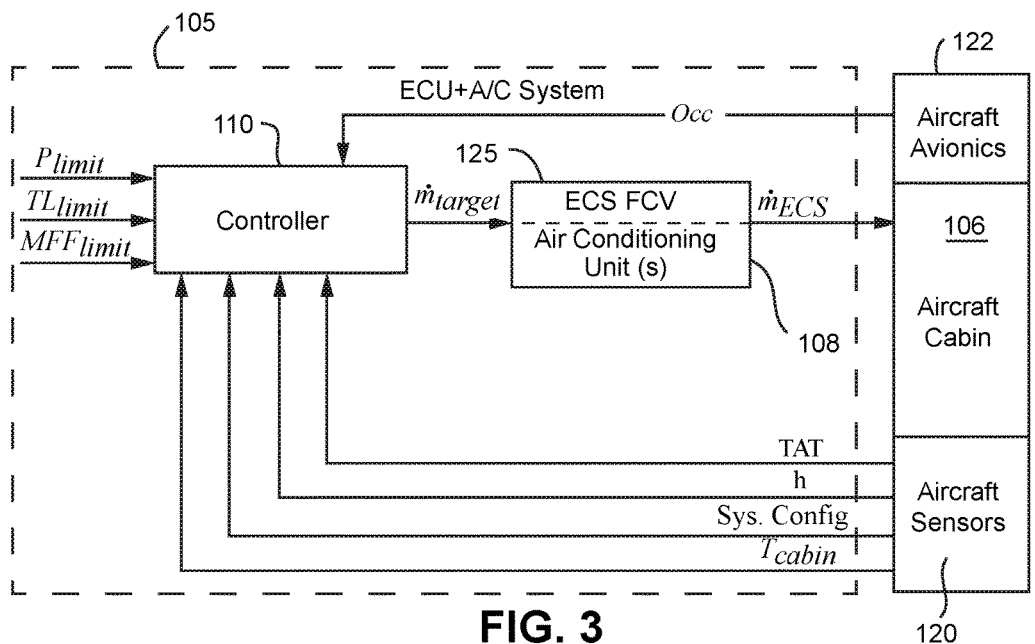
FIG. 3 shows a functional block diagram of the FIG. 1 environment control unit (ECU), which includes a controller and providing a flow control valve (FCV) as part of an air conditioning unit.

FIG. 3 shows a functional block diagram of the example non-limiting embodiment showing input and control signals. FIG. 3 depicts the relationship between the air conditioning units 108 and the environmental control unit controller 110, and how such components provide air mass flow to the aircraft cabin 106. The environmental control unit 105 comprises: a controller 110, flow control valve(s) (FCV) 125, and the air conditioning unit(s) 108. The controller 110 can provide the FCV 125 and the air conditioning units 108 with a mass flow target by measuring a plurality of parameters with the sensors 120 of the aircraft and also receiving inputs from the aircraft avionics system 122. When the controller 110 is given an ECS airflow target, the whole unit 105 provides an adjusted ECS airflow to the aircraft cabin 106.

Figure 5:
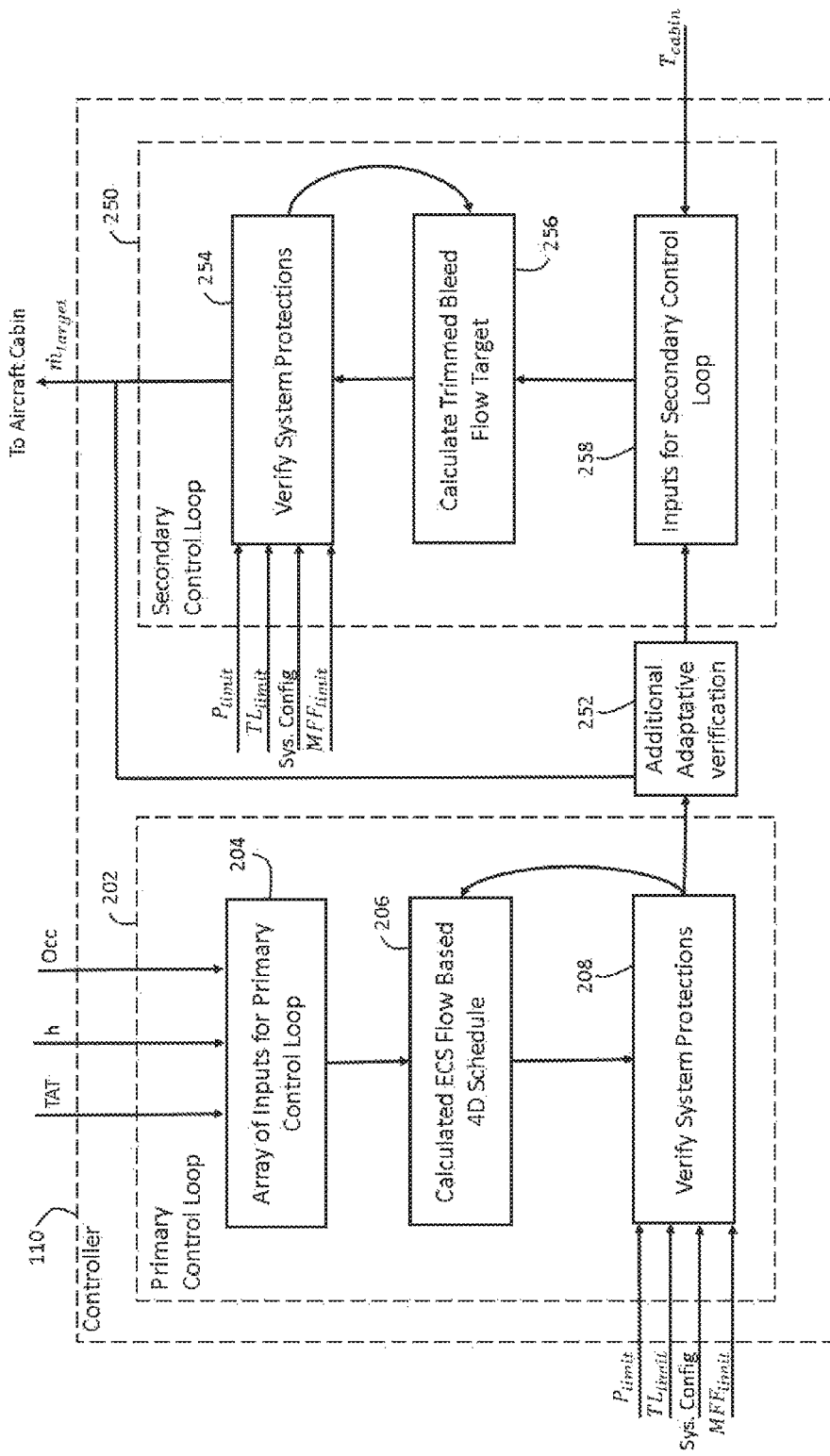
FIG. 5 shows a flow chart diagram of example non-limiting logic to calculate and trim the ECS airflow target executed by the FIG. 3 controller.

To facilitate disclosure, the variables in FIGS. 3 and 5 are listed and described below:

| VARIABLE | DESCRIPTION |
| --- | --- |
| $MFF_{limit}$ | Ventilation requirements based on FAR/JAR 25.831 |
| $P_{limit}$ | Minimum ECS Flow in order to properly maintain the aircraft pressurization |
| $TL_{limit}$ | Minimum ECS Flow in order to properly maintain the aircraft Temperature (Thermal Load) |
| ECU | Environmental Control Unit |
| HEPA | High-Efficiency Particulate Arrestance |
| TAT | Aircraft Total Air Temperature |
| h | Aircraft Flight Altitude |
| Sys. Config | System integrity status, such as failure condition of equipment of the system |
| Occ | Number of occupants in a given flight |
| $T_{cabin}$ | Zone Temperature of the aircraft controlled environment |
| $\dot{m}_{target}$ | ECS airflow target |
| $\dot{m}_{ECS}$ | Actual airflow and controlled by the environmental control system |

| VARIABLE | DESCRIPTION |
| --- | --- |
| ECS | Environmental Control System (Air Conditioning System) |

FIG. 2 shows a diagram of logic used to calculate the ECS airflow target executed by the controller 110 in FIG. 3. The controller 110 executes two main loops: a primary control loop 202, which calculates the ECS airflow target based 4D schedule map, and a secondary control loop 250, which trims the calculated ECS airflow target from the primary control loop to provide an ECS airflow target signal. The ECS airflow target control signal is then sent to the FCV 125 and the Air Conditioning Unit 108 to control bleed airflow. The controller algorithm comprises these two control loops which constantly calculate and trim the target as the environment and other operating conditions of the aircraft changes.

Figure 4A:
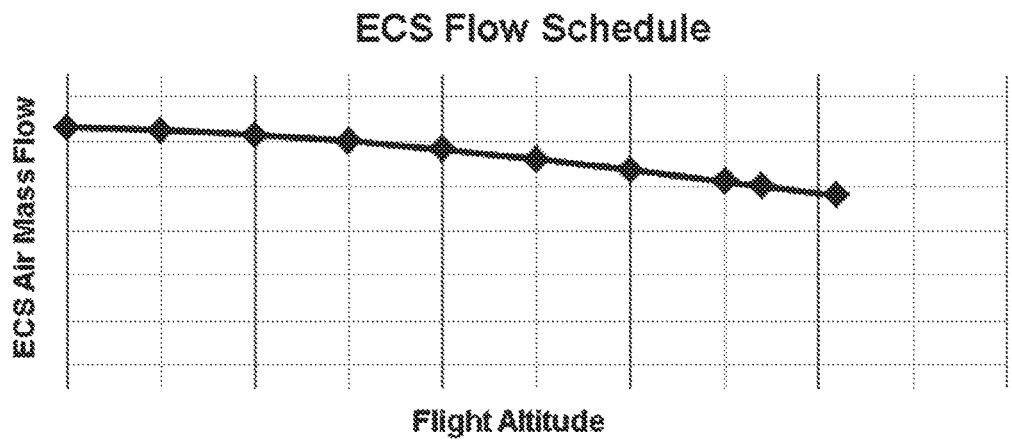
FIG. 4A shows example of commonly used ECS flow schedule curve, which have a fixed value based flight altitude.

FIG. 4A shows example of commonly used ECS flow schedule curve, which have a fixed airflow value for each flight altitude based flight altitude vs. airflow map.

Figure 4B:
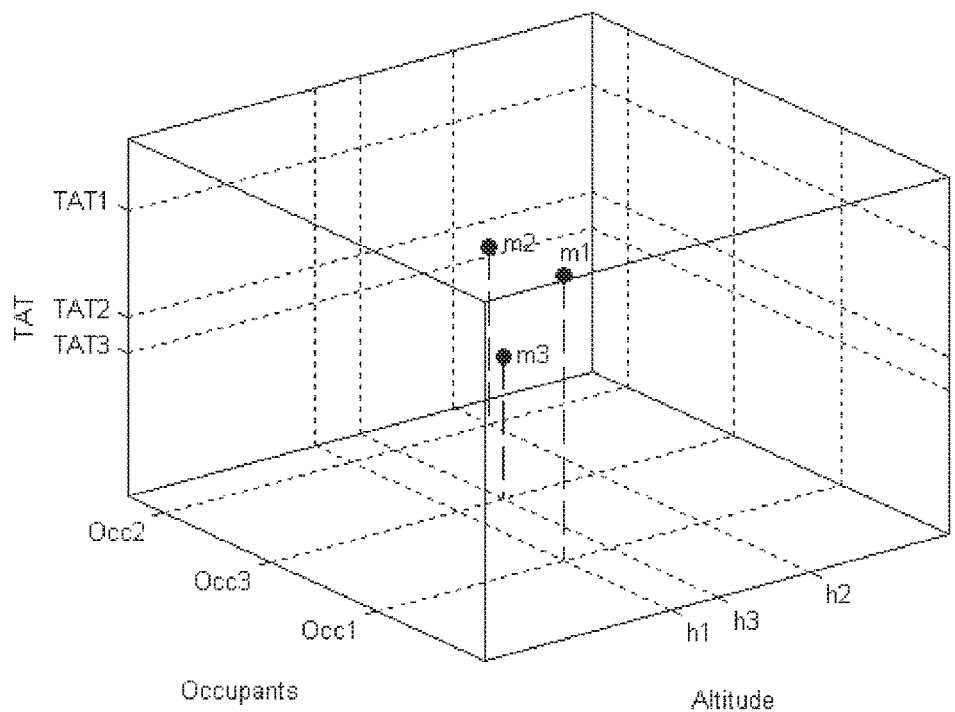
FIG. 4B is an example of ECS 4D-flow schedule, which provide airflow values based stored 4D lookup table.

FIG. 4B is an example of ECS 4D flow schedule, which provide airflow values based on the flight altitude, total air temperature and number of occupants.

In some operations, the airflow demand is affected by the system configuration of the aircraft such as anti-ice system, failure of the pneumatic and air condition systems, etc.

FIG. 5 shows a more detailed diagram of the logic used to calculate the ECS airflow target inside of the controller 110. Such logic can be implemented by software instructions stored in non-transitory memory and executed by one or more microcomputers or microprocessors. Loops 202, 250 can be performed by the same processor or by different processors.

The primary control loop 202 can provide an ECS airflow target through three steps. The primary control loop 202 uses an array of inputs 204 to calculate ECS airflow based 4D Schedule map 206. Once the primary control loop 202 calculates ECS airflow based 4D Schedule map 206, the control loop also verifies it using stored parameters, to maintain required pressurization, ventilation and thermal load requirements 208. Then the primary control loop 202 sends out a signal to the secondary control additional adaptive evaluation (calculation) 252 to determine whether ECS airflow otherwise required can be trimmed or optimized.

The secondary control loop 250 constantly trims the calculated ECS airflow target 206. The primary control loop 202 sends the ECS airflow target based 4D schedule map 206 signal to a processing block 258 (after passing through 208, 252) which also receives inputs from cabin temperature sensor. The secondary control loop processing block 258 optimizes bleed flow consumption by regulating ECS airflow and fixing the air conditioning unit outlet temperature. The trimmed ECS airflow target signal 256 is then sent to a verification block 254, where the control loop maintains required pressurization, ventilation and thermal load requirements. A difference between the primary control loop 202 and the secondary control loop 250 is that the primary loop calculates the ECS airflow target based 4D schedule map. The ECS airflow target is then sent through a signal to the secondary control loop 250 for trimming. The secondary control loop 250 trims the ECS airflow target. The flow control valve(s) 125 and the air conditioning units) 108 then receive trimmed flow target signal, only then the system provide the proper air mass flow to the aircraft cabin.

While the invention has been described with what is presently considered the most practical and preferred embodiments, it is to be understood that the invention is not to be limited to the disclosed embodiments, but on the contrary, should cover various modifications and equivalent arrangements within the spirit and scope of the appended claims.

The invention claimed is:

1. A controller for controlling atmosphere inside the cabin of an aircraft of the type that supplies extracted bleed air to an air conditioning system, the controller comprising at least one processor configured to execute:
 a first control loop configured to:
 (a) calculate an environmental control system airflow target based on a multi-dimensional airflow schedule map including altitude, number of occupants, and external air temperature, and
 (b) verify the calculated environmental control system airflow target against at least a pressurization limit; and
 a second control loop connected to receive the environmental control system airflow target the first control loop calculates, the second control loop being configured to:
 (i) set a fixed environmental control system airflow outlet temperature based on performance capabilities of the air conditioning system,
 (ii) trim the airflow target in response to a measured cabin temperature,
 (iii) verify the trimmed airflow target against at least a pressurization limit, and
 (iv) output a verified trimmed airflow target control signal to control a flow control valve.

2. The controller of claim 1, wherein the at least one processor is further configured to receive a sensor signal indicating a temperature within the cabin and execute the second control loop to trim and validate the airflow target, the second control loop being configured to adaptably regulate inlet airflow through the flow control valve.

3. A method for controlling atmosphere inside of an aircraft, comprising:
 calculating and validating inlet airflow target;
 trimming and revalidating a previous inlet airflow target;
 sending an inlet airflow target control signal to a system component(s); and
 using the environmental control system to control the atmosphere inside of the aircraft,
 wherein the inlet airflow target is calculated and validated against at least pressurization, in a first control loop, and
 wherein a secondary control loop, different from the first control loop, is used to trim and revalidate the inlet airflow target against at least pressurization, and provide an inlet airflow target control signal based on the trimmed inlet airflow target to control extracted bleed airflow.

4. The method of claim 3, wherein the secondary control loop reduces extracted bleed airflow consumption by varying the inlet airflow target while fixing an environmental control unit outlet temperature.

5. The method of claim 4, wherein the secondary control loop sets the environmental control unit outlet temperature and regulates inlet airflow based on the environment control system thermal performance capabilities.

6. The method according to claim 3, wherein the trimming is performed in response to a cabin temperature measured by a sensor within the aircraft.

7. The method of claim 3, wherein the first control loop calculates the inlet airflow target based on a multi-dimensional environmental control system airflow schedule map and aircraft operating conditions, and also controls the mixing between inlet airflow and with recirculation air to maintain cabin comfort.

8. The method of claim 3, wherein said calculated inlet airflow target is based on altitude, number of occupants and external air temperature.

9. The method of claim 3, wherein the first and secondary control loops each independently validate the inlet airflow target based on system configuration(s).

10. The method of claim 3, further including the first and secondary control loops each independently validating inlet airflow target by comparing ventilation, thermal load and pressurization requirements.

11. A controller for controlling atmosphere inside an aircraft via an environmental control system that provides at least part of the atmosphere within an aircraft, the controller comprising at least one processor arrangement that executes instructions comprising:
a primary control loop configured to (a) calculate an environmental control system airflow target based on a multi-dimensional airflow schedule map including a plurality of parameters, and (b) validate the calculated environmental control system airflow target against at least a pressurization limit; and
a secondary control loop configured to (a) receive the environmental control system airflow target calculated and validated by the primary control loop, (b) fix an environmental control unit outlet temperature, (c) trim the calculated environmental control system airflow target the primary control loop determines, (d) further validate the trimmed airflow target against at least a pressurization limit, and (e) apply the further validated, trimmed airflow target to modulate a flow control valve.

12. An air handling system comprising:
an air handler; and
a controller coupled to sensors and to the air handler, wherein the controller utilizes information from a multi-dimensional airflow schedule map and wherein the controller assesses cooling/heating system performance capabilities, the controller comprising:
a primary control loop configured to (a) calculate an environmental control system airflow target, (b) control the mixing between environmental control system airflow and recirculating air based on a plurality of parameters; and (c) validate the calculated environmental control system airflow target against at least a pressurization limit, and
a secondary control loop connected to receive the calculated environmental control system airflow target, the secondary control loop being configured to (a) set a fixed environmental control unit outlet temperature, (b) trim the environmental control system airflow target in response to a measured cabin temperature, (c) validate the trimmed environmental control system airflow target against at least a pressurization limit, and (d) use the trimmed and validated environmental control system airflow target to control extracted bleed airflow.

13. An aircraft including the air handling system of claim 12.

14. An aircraft air handling system comprising:
a flow control valve;
an air conditioning unit;
an environment control system; and
at least one processor configured to perform a first control loop and a second control loop,
the first control loop configured to calculate an inlet air mass flow to control mixing between the inlet air mass flow and recirculated cabin air to maintain environment comfort within an aircraft cabin; and
the second control loop, being operatively coupled to control the flow control valve and the air conditioning unit, the second control loop being configured to manage air conditioning unit bleed air usage by fixing an air handling system outlet temperature while trimming the calculated inlet air mass flow and applying a trimmed inlet air mass flow control signal to the flow control valve to meet thermodynamic performance required to maintain environment comfort within the aircraft cabin.

15. The system of claim 14, wherein the second control loop executes an adaptive control optimizing bleed airflow consumption by regulating environmental control system inlet air mass flow and while concurrently fixing the environmental control unit outlet temperature.

16. The system of claim 14, wherein the second control loop sets the outlet temperature and regulates inlet air mass flow, limited by thermal performance capabilities of the air conditioning unit.

17. The system of claim 14, wherein the second control loop is further structured to validate the trimmed air mass flow based on system configuration(s).

18. The system of claim 14, wherein the second control loop is structured to validate the trimmed air mass flow by comparing ventilation, thermal load and pressurization requirements.

19. The system of claim 14, wherein the second control loop is structured to trim an airflow target in response to measured cabin temperature.

20. The system of claim 14, wherein the first control loop calculates an inlet airflow target by accessing a multi-dimensional environmental control system airflow schedule map to controls usage of recirculated airflow.

21. The system of claim 14 wherein the first control loop is structured to validate the calculated inlet airflow target based on system configuration(s).

22. The system of claim 14, wherein the first control loop is structured to validate the calculated inlet airflow target by comparing ventilation, thermal load and pressurization requirements.

23. The system of claim 14, wherein the first control loop is structured to calculate inlet airflow target based on altitude, number of occupants and external air temperature inputs.

24. A controller for controlling atmosphere inside an aircraft of the type that supplies bleed air from a turbine to an environmental control system that mixes supplied bleed air with recirculated cabin air to maintain cabin ventilation, temperature and pressurization, the controller comprising at least one processor configured to execute:
a first control process to generate and validate a bleed airflow target signal in response to at least number of occupants, altitude and external air temperature to control consumption of the extracted engine bleed air by the environmental control system, and
a second control process connected to receive the bleed airflow target signal the first control process generates, the second control process being configured to adaptively trim and validate the bleed airflow target signal to reduce consumption of the extracted engine bleed air by the environmental control system.

25. The controller of claim 24 wherein the first control process validates the calculated bleed airflow target signal based on at least pressurization, and the second control process revalidates the trimmed bleed airflow target signal based on at least pressurization.

26. The controller of claim 24 wherein the second control process controls a flow control valve in response to the trimmed bleed airflow target signal.

* * * * *